March 10, 1925. 1,529,599
A. LEVENE
DIFFERENTIAL MECHANISM
Filed Nov. 25, 1922 3 Sheets-Sheet 1

INVENTOR.
Alexander Levene
BY Vernon E. Hodges
his ATTORNEY

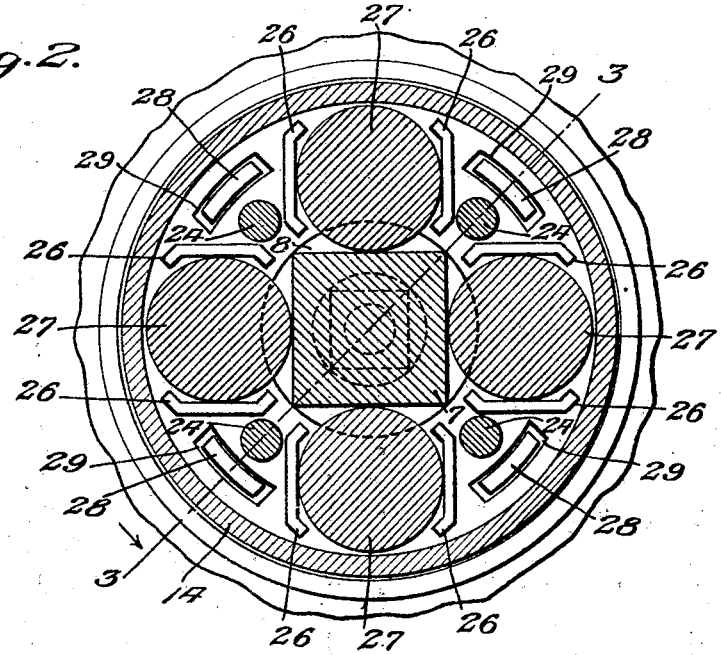
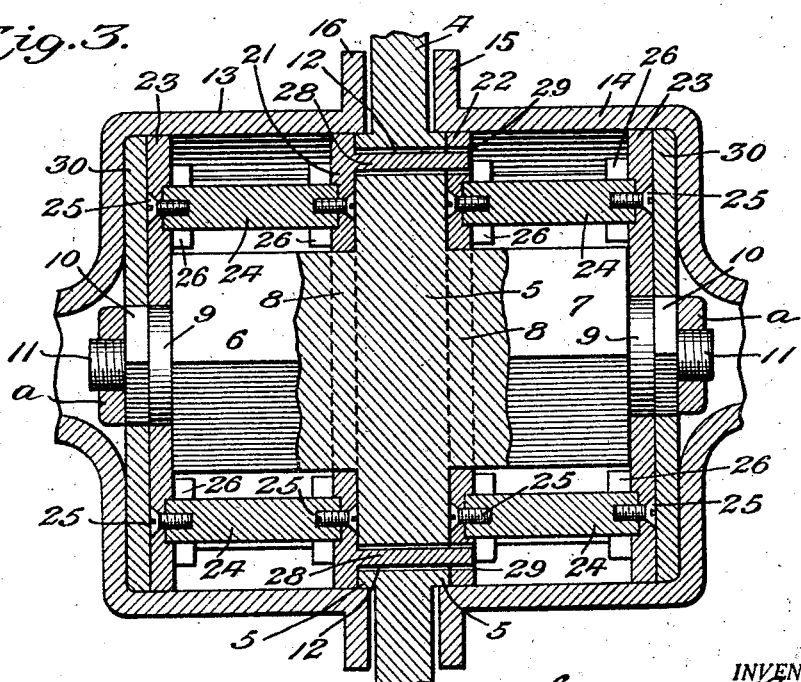

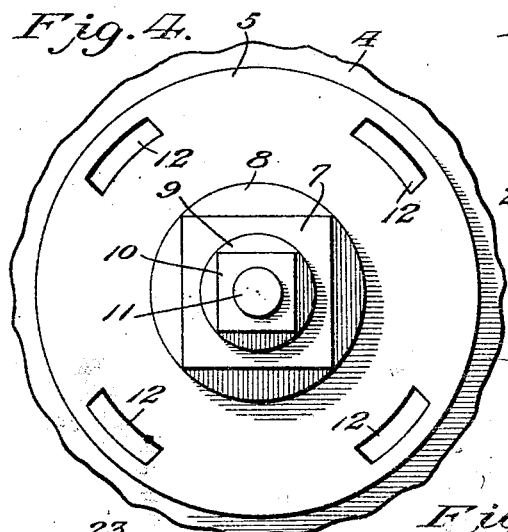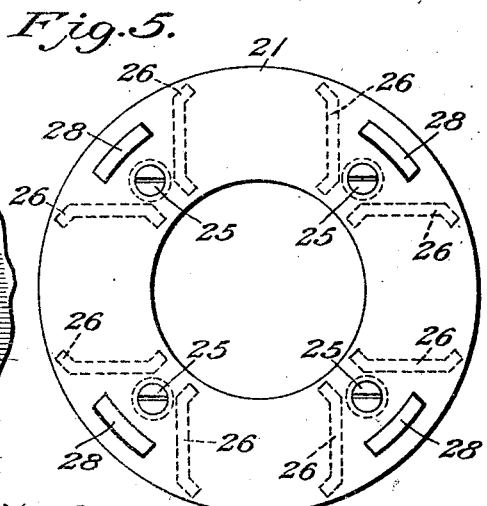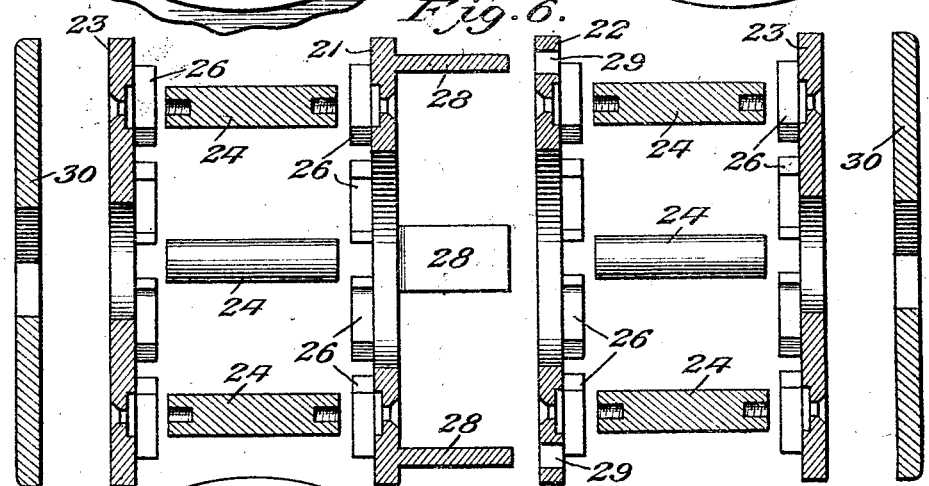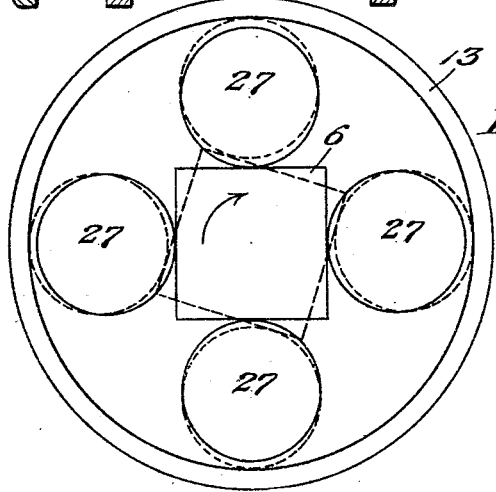

Patented Mar. 10, 1925.

1,529,599

UNITED STATES PATENT OFFICE.

ALEXANDER LEVENE, OF NEW YORK, N. Y.

DIFFERENTIAL MECHANISM.

Application filed November 25, 1922. Serial No. 603,279.

*To all whom it may concern:*

Be it known that I, ALEXANDER LEVENE, a citizen of the United States, residing at New York, borough of Manhattan, in the county of New York and State of New York, have invented certain new and useful Improvements in Differential Mechanism, of which the following is a specification.

My invention relates to new and useful improvements in differential mechanisms.

Whenever the power in a vehicle is applied through an axle, the wheels at the extremities of the driven axle must be mounted thereon rigidly. The wheels then revolve together with the axle, and the rotation of the axle propels the vehicle. Upon a curved road or at a turn in the road, and sometimes upon an uneven road, the wheels at the opposite ends of the axle are compelled to revolve at varying speeds. It is obvious that this would be impossible if both wheels were rigidly mounted upon a solid axle. To permit this variation or differentiation in the speed of the opposite wheels, the axle is divided into two members, and a differential mechanism is inserted between the two members of the axle. The differential mechanism is connected with the motive means of the vehicle by a shaft or chain, and the differential mechanism permits the transmission of power to either or both axle members, and also permits the disconnection of one axle member from the motive means, when required by road conditions.

In the usual gear type of differential mechanism now in use, the practice is to apply the power to only one axle member at a time, and this is usually the member upon which is mounted the more rapidly revolving wheel. With this type of differential mechanism it is virtually impossible to apply power simultaneously to both axle members, unless an axle locking device is used, and then the power is not directly applied to both axle members, but is applied directly to but one member, and from this member indirectly through the locking device to the other member.

In my differential mechanism, I eliminate gears with their resultant loss of power, and thereby secure a stronger and more efficient differential. I also radically improve the operation of the differential mechanism, in that in my mechanism the power is equally and directly applied to both axle members, whenever the road conditions permit equal revolution of both wheels. Whenever road conditions require differentiation between the two wheels, the faster revolving wheel, and its axle member immediately and automatically unlock, leaving the application of power on the slower moving wheel, which is directly contrary to the operation of the usual gear type differential. By applying power equally and directly to both axle members, my differential mechanism obviously gives much better traction. With my mechanism, neither wheel can revolve slower than or lag behind the motive power, and both wheels receive an equal amount of power and have equal traction unless due to road conditions one wheel is compelled to travel a greater distance, whereupon such faster moving wheel automatically becomes disconnected from the motive means. Due to this equal application of power upon both wheels, I minimize the possibility of loss of traction in the event that one wheel becomes imbedded in mud, sand, or snow or in the event that one wheel rests upon a slippery road surface. Under such conditions with the use of my differential, the vehicle will continue to be propelled, due to the fact that both wheels have traction, whereas the ordinary gear type differential the power is only applied to the wheel which revolves with the greater ease, causing that wheel to spin without propelling the vehicle. A vehicle equipped with the ordinary gear type differential when making a turn in the road has traction on the outer or faster revolving wheel, and the inner or slower revolving wheel is disconnected from the motive means, and either stops revolving, or at times, actually reverses, causing the vehicle to skid. A vehicle equipped with my type or differential mechanism will under similar conditions retain traction upon the inner or slower revolving wheel, thereby greatly minimizing the possibility of skidding.

In the accompanying drawings:

Fig. 2 is a section on line 2—2 of Fig. 1 looking in the direction of the arrow;

Fig. 3 is a section on the diagonal line 3—3 of Fig. 2 looking in the direction of the arrow;

Fig. 4 is a detail view looking toward the left with the cup member and outer plates removed and showing a fragment of the ring gear disc;

Fig. 5 is a view of the left hand inner plate looking toward the left;

Fig. 6 is a sectional view showing spread apart the various internal members of the differential with the exception of the ring gear disc, angular shafts, rollers and cup members;

Fig. 7 is a view showing the different relative positions of one cup member, an angular shaft and a set of rollers, all the parts with the exception of the cup member being shown in full and dotted lines.

Figure 1:
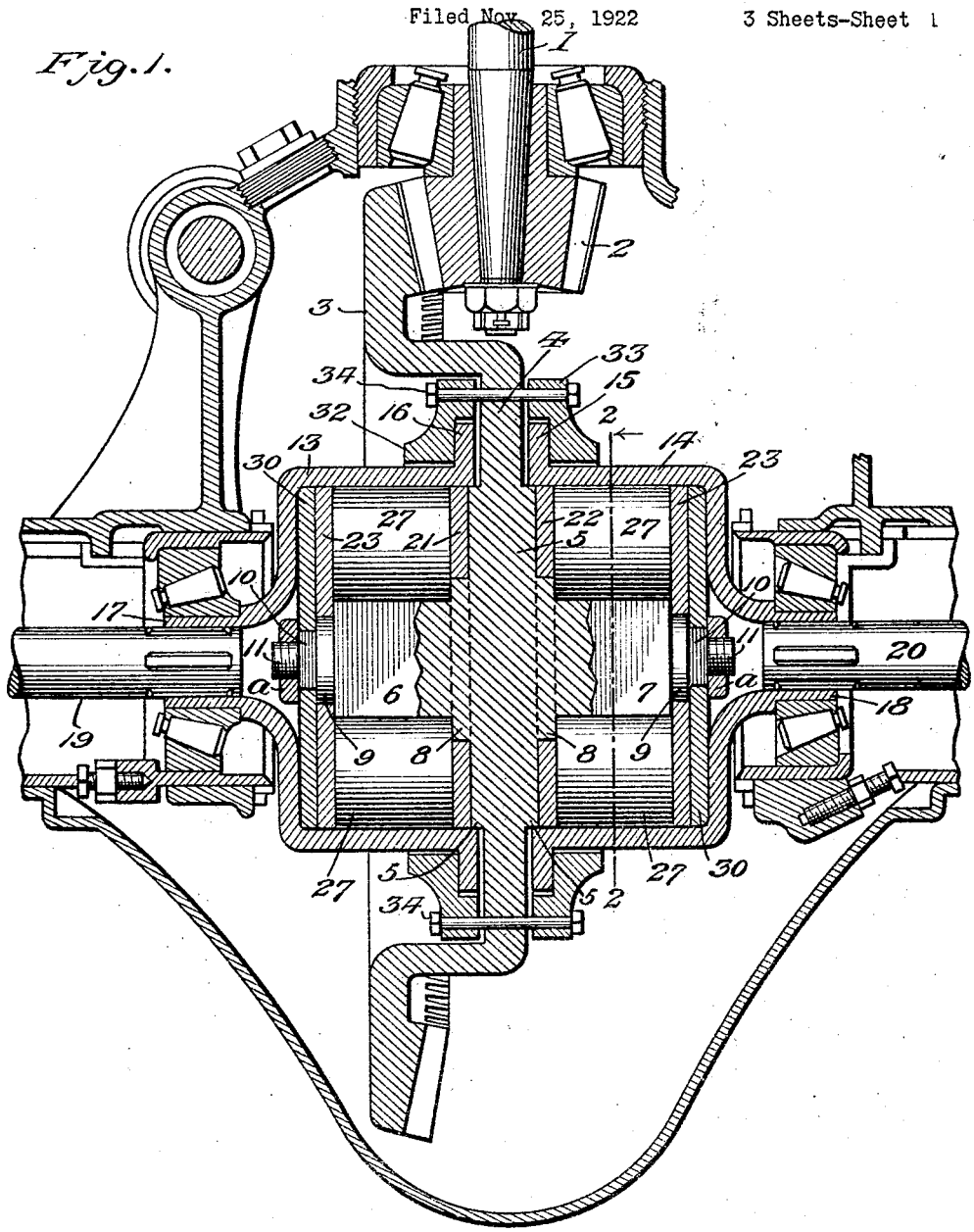
Figure 1 is a fragmentary sectional view of the differential mechanism.

The motive power of the vehicle is conveyed through a shaft 1, at the end of which is a bevel gear 2. Engaging this bevel gear 2 is a ring gear 3 forming an integral part of a disk 4. On each face of the disk 4, and integral therewith is a collar 5 for the purpose of engaging and guiding the two cups as will be hereafter described. Extending in opposite direction from the center of disk 4 and integral therewith are two shafts 6 and 7. At the inner end of each shaft is a circular collar 8 somewhat larger in diameter than the diameter of the shaft. At the outer end of each shaft is a circular collar 9 somewhat smaller in diameter than the diameter of the shaft. Beyond the collar 9 and smaller than the diameter of the collar 9 is a square lug 10, and beyond the lug 10 is a threaded portion 11 made to receive a nut $a$. I prefer to drop forge all these members 4, 5, 6, 7, 8, 9, 10 and 11 out of one piece of metal, although they might be built of separate parts. In the disc 4 I provide a series of slots 12, the purpose of which will be hereafter disclosed.

Surrounding each shaft member 6 and 7 I provide two cup members 13 and 14, the internal diameter of which is slightly greater than the diameter of the collar 5. The inner ends of the cup members 13 and 14 are turned outwardly to form the flanges 15 and 16. The outer ends of the cups 13 and 14 are formed into sleeves 17 and 18 for the purpose of receiving the two axle members 19 and 20 which are keyed thereto and at the outer ends of which are mounted the wheels of the vehicle.

Surrounding the shafts 6 and 7 and within the cups 13 and 14 I provide two roller carriage members of the following construction.

Each carriage member is provided with an inner plate 21 and 22, having a circular opening in the center large enough to freely fit the collar 8. Each carriage member is likewise provided with an outer plate 23 having a circular opening in the center large enough to freely receive the collar 9. The respective plates of each roller carriage member are rigidly connected by the studs 24, which may be either held in position by the screws 25 as shown on the drawings, or else may be riveted or otherwise permanently locked. The respective roller carriage plates are provided with guide plates 26 for the purpose of engaging and confining rollers 27. The diameter of the rollers must be a little less than the distance between the surface of the shafts 6 or 7 and the inner periphery of the respective cups 13, 14.

Referring to Fig. 2, it will be seen that the guide plates 26 are so constructed as to embrace the rollers 27 snugly on each side without binding them, while permitting free radail motion of the rollers with reference to the roller carriage plates. The purpose of this construction is to permit the rollers to roll along the respective surfaces of the shaft member 6 or 7, while the roller carriage is slightly rotating upon the collars 8 and 9. If the rollers 27 were not permitted freedom of action radially with reference to the roller carriage plates, then the rotation of the roller carriage plates with reference to the shaft members would tend to carry the rollers in an arc, whereas they should be pushed along the respective surfaces of the shaft member. Laterally the guide plates should fit snugly against the rollers without binding, so that upon the rotation of the roller carriage member all rollers will move equally and simultaneously, with only sufficient freedom to revolve within their respective guide plates.

Although I show the method of mounting the rollers by the use of the guide plates, I do not limit myself to this method. The rollers might be provided with circular lugs at their extremities, which lugs could fit into slots in the carriage plates. Such slots should also be made somewhat elongated radially with reference to the carriage plates, so as to secure the action above described.

The inner plate 21 of one of the roller carriage members is provided with a series of fingers 28 which extend through and beyond the slots 12 in the disc 4. The inner plate 22 of the opposite roller carriage member is provided with slots 29, which receive the fingers 28. The slots 12 must be considerably larger than the fingers 28 in order to allow for the rotation of the roller carriage members with reference to the disc and shaft member. The slots 29 must be somewhat larger than the fingers 28 in order to permit a slight difference of action between the two opposite carriage members. The purpose and operation of these fingers and slots will hereafter be more fully explained.

After mounting the roller carriage members upon the shafts as above described, circular guide plates 30 equal in diameter to the diameter of the collar 5 and each provided at the center with a square opening to fit the lug 10, are mounted upon the lugs 10, and the roller assemblies are then locked by means of the lock nuts $a$ which screw upon the threaded members 11.

Surrounding the inner end of each cup 13 and 14 I provide retaining rings 32 and 33 which bear upon the outer surfaces of the flanges 15 and 16. The rings 32 and 33 are fastened to each other and to the disc 4 by means of bolts 34.

Although in my drawings I show a device with four rollers in each roller carriage member, I do not limit myself to this type. The device can be constructed with a lesser or greater number of rollers in each carriage, in which event the shaft members 6 and 7 must be constructed with surfaces equal in number to the number of rollers used. If only one roller should be used in each carriage, then the shaft members 6 and 7 should be provided with one surface adjacent to the roller, and the opposite side of the shaft member should be extended to make sliding contact with the inner surface of the cup member. My experience has shown that the four roller type is the best balanced and most efficient for universal use, although possibly a less number of rollers might suffice for a light duty differential mechanism, and a greater number might be advantageous for extreme heavy duty.

Although in the drawings I show the disc member 4 curved at its periphery to receive the ring gear, I do not limit myself to this method of mounting. The ring gear can be mounted in various ways depending upon the construction of the vehicle. The disc 4 may be extended straight instead of bent, and the ring gear mounted directly thereon, or the ring gear can be mounted upon one of the retaining rings 32 or 33, or if a worm gear type of drive is used, then the ring gear can be mounted directly upon the periphery of the disc member and in a chain drive vehicle a sprocket wheel can be mounted similarly to the ring gear of a worm gear drive.

The operation of my differential mechanism is as follows:

In a normal unlocked position each roller is floating at the center of its respective face of the shaft and makes no contact between the shaft and the cup. When the power of the motor is applied to the disc member, through the driving shaft or chain, then the shaft members begin to revolve, thereby tripping the rollers and causing them to wedge between the shaft and the cup, and in this manner locking the cups to the shafts and causing the axle members to revolve and the vehicle to be propelled. In Fig. 7 the full lines represent the rollers in their normal position and the dotted lines represent the rollers in their wedged or locked position. The mounting of all the rollers in the roller carriage member causes them to trip or wedge in unison. If one or two rollers should tend to lock before the others, then such locked roller would instantly cause the roller carriage to move with it, and this action would simultaneously carry all other rollers into the locked position.

As long as the vehicle continues in forward motion, the forward rotation of the shaft members caused by the application of power, and the back drag, inertia or load on the wheels imparted to the cup members, serve to maintain the rollers in a wedged or locked position, as indicated in dotted lines in Fig. 7.

When the vehicle reaches a turn in the road, the outer wheel is compelled to travel a greater distance than the inner wheel, and therefore has a tendency to revolve faster than the inner wheel. The wedging of the rollers within the cup attached to the inner wheel axle member becomes under such conditions stronger than before, and the rotation of the shaft member is held down to the speed of rotation of the cup member attached to the inner wheel. The faster rotation of the outer wheel is imparted to its cup member, and this cup member instead of acting as a back drag against its shaft member, tends to rotate faster than its shaft member, thereby releasing its series of rollers from their wedged or locked condition, and tripping them into their normal or unlocked position. If there were no connection between the two roller carriage members, then the unlocked rollers would then tend to be tripped to the opposite side and would become wedged on that side. To prevent the released rollers from being thrown into such opposite locked position, the two roller carriage members are detachably connected by means of the fingers 28 and the slots 29. The clearance or difference in size between these fingers and slots is so arranged as to permit the released roller carriage to move back into its normal position, but to prevent it from going beyond this position into a reversed locked position. In this way these fingers and slots act as a braking mechanism and regulate the relative position of the two roller carriages, so as to permit one roller carriage member to remain in a locked position, while the other roller carriage member is in an unlocked or normal position. Without the finger and slot device, my differential mechanism consists of two roller locking clutches, and the finger and slot device regulates the relative action of the two clutches so as to convert them into a differential.

Although I describe a finger and slot device to accomplish this purpose, any other form of detachable connection between the two roller carriages may be used, provided the freedom of action between the two roller carriage members is limited to the distance between a locked position of one carriage and a normal unlocked position of the other carriage.

When the vehicle leaves the turn in the road and assumes its course upon a straight road, the rate of rotation of the outer wheel no longer exceeds the rate of rotation of its shaft member, but is reduced to the rate of rotation of the inner or locked wheel. The rate of rotation of the cup member connected with the outer wheel is similarly reduced, and the rollers on that side are therefore once more tripped into the wedged or locked position, and the vehicle once more proceeds with full traction on both wheels. When the vehicle is propelled in reverse, the operation of my differential is exactly the same as in forward motion, except that the rollers wedge or lock in a position opposite to their position when in forward motion.

When coasting down hill and using the motor as a brake or when any other braking means is applied to the driving shaft, the wheels temporarily continue to revolve at the same rate of speed as prior to the application of the brake, but the driving power is removed from the shaft members. The cups therefore have a tendency to rotate faster than the shafts and this action releases the rollers from their wedged or locked position. Both roller members being simultaneously released, they both trip back into the reverse wedged or locked position, and the braking force applied through the driving shaft to the two shaft members of the differential is therefore imparted to both the cups and both wheels simultaneously. In a gear type differential, a braking force applied through the driving shaft is only transmitted to one wheel.

The operation of my differential mechanism is positive and instantaneous, so that my mechanism will differentiate whenever road conditions require it and will operate as a solid axle whenever road conditions permit it.

I claim:

1. A differential mechanism including a driving member, driven members, shafts connected with the driving member, cups rotatably connected with the driving member, rollers housed within the cups, roller carriage members within the cups, and guide-plates extending inwardly from each side of each of the roller carriage members for receiving and embracing the ends of the rollers.

2. A differential mechanism including a driving member, cups rotatably connected with the driving member, rollers housed in the space between the cups and the shafts, two roller carriage members connected with the shafts, and guide-plates connected with and extending inwardly from each side of each of the roller carriage members for receiving and embracing the ends of the rollers and serving to maintain the relative circumferential distance between the rollers.

3. A differential mechanism including a driving member, driven members, shafts connected with the driving member, cups rotatably connected with the driving member, rollers housed in the space between the cups and the shafts, two roller carriage members connected with the shafts and including plates spaced apart, studs for separating said plates, and guide plates connected with and extending inwardly from each of the plates for receiving and embracing the ends of the rollers.

4. A differential mechanism including a driving member, driven members, shafts connected with the driving member, cups rotatably connected with the driving member, rollers housed in the space between the cups and the shafts two roller carriage members connected with the shafts, guide plates connected with and extending inwardly from each side of each of the roller carriage members for receiving and embracing the ends of the rollers, one of the roller carriage members having fingers connected therewith, and the other roller carriage member having slots therein to receive the fingers for effecting a differential action between the two roller carriage members.

5. A differential mechanism including a disk, a collar thereon, shafts extending in opposite directions therefrom, driven members, cups connected with the driven members, rollers inserted in the spaces between the shafts and the cups, two roller carriage members connected with the shafts, guide plates connected with and extending inwardly from each side of each of the roller carriage members for receiving and embracing the ends of the rollers, one roller carriage member having fingers connected therewith, the disk, collar, and other roller carriage member each having slots therein to receive the fingers for permitting a limited independent movement to one roller carriage member with respect to the other.

In testimony whereof I affix my signature.

ALEXANDER LEVENE.